Patented Dec. 11, 1928.

UNITED STATES PATENT OFFICE.

HERMANN WAGNER, OF HOCHST-ON-THE-MAIN, GERMANY, ASSIGNOR, BY MESNE ASSIGNMENTS, TO GRASSELLI DYESTUFF CORPORATION, OF NEW YORK, N. Y., A CORPORATION OF DELAWARE.

AZO DYE.

No Drawing. Application filed February 12, 1923, Serial No. 618,710, and in Germany February 24, 1922.

In further developing the inventive idea set forth in U. S. Patent 1,493,577, according to which by combining certain halogen-substituted diazo-compounds with a halogen substituted toluidide of 2.3-hydroxynaphthoic acid dyestuffs are obtained of particularly great fastness, above all of a particularly striking fastness to kier-boiling and to light, I have found that dyestuffs of equally excellent fastness, particularly a striking fastness to kier-boiling, are produced by the combination of any diazo compound with an arylamide of the 2.3-hydroxynaphthoic acid, halogenated in the aryl residue and substituted by an alkyl- or alkyloxy-group in the para position of the imino group. I have furthermore found that azo dyes of equally good fastness are obtained by coupling halogenated diazo components containing an alkyl- or alkyloxy-group with arylamides of the 2.3-hydroxynaphthoic acid not halogenated in the aryl residue, but containing in the para position to the imino group an alkyl- or alkyloxy group. The preparation of the dyestuffs may be effected in solution which gives pigment-dyestuffs; the coupling may however, also be carried out on the fibre in printing as well as in piece- and yarn dyeing.

Examples.

1. Material is padded with an aqueous solution containing, in 1 liter: 20 gr. of 2.3-hydroxynaphthoic acid chloro-toluidide (NH:Cl:CH$_3$=1:2:4), 60 gr. of a 22° Bé. caustic soda solution and 20 gr. of para-soap PN. It is then dried and printed with the printing colour obtained by mixing 15.2 gr. of o-anisidine with 24 ccm. of hydrochloric acid 22° Bé. to a paste in the presence of 200 ccm. of water, cooling with 150 gr. of ice, adding a solution of 8 gr. of sodium nitrite in 50 ccm. of water and thereafter 550 gr. of tragacanth 60:1000, to which reaction mixture there is added, before use, 20 gr. of sodium acetate.

The structural formula of the dyestuff is as follows:

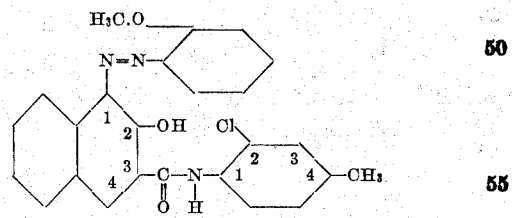

"Para-soap PN" designates ammonium ricinoleate. By the term "tragacanth 60:1000" is meant a solution of 60 parts by weight of tragacanth in 1000 parts of water.

2. Yarn is printed with the aqueous preparation which contains, in one liter: 12.7 gr. of 2.3-hydroxynaphthoic acid-chloroanisidide (NH:Cl:OCH$_3$=1:3:4). 20 ccm. of 34° Bé. caustic soda solution, and 30 ccm. of sodium Turkey red oil 50%. The so-impregnated yarn is wrung out and dyed with the diazo-solution which is obtained by dissolving 14.1 gr. of 4-chloro-2-toluidine in 24 ccm. of hydrochloric acid 22° Bé. and 200 ccm. of boiling water, cooling with 150 gr. of ice, treating with a solution of 8 gr. of sodium nitrite in 50 ccm. of water while stirring, making up to 4 liters with water, and adding, before use, 20 gr. of sodium acetate.

After dyeing, the yarn is well wrung out, washed, and soaped.

The dyestuff has most probably the following structural formula:

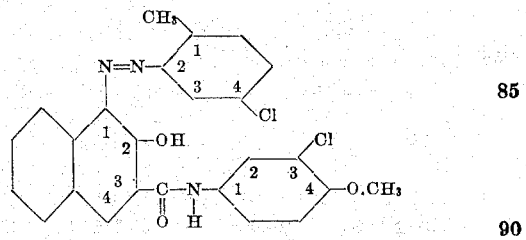

3. Material is padded with an aqueous solution containing, in one liter: 20 gr. of 2.3-hydroxynaphthoic acid-chloro-anisidide (NH : Cl : OCH₃ = 1 : 3 : 4), 60 gr. of 22° Bé. caustic soda solution and 20 gr. of para-soap PN. It is then dried and printed with the printing color obtained by mixing 15.7 gr. of chloro-anisidine (OCH₃ : NH₂ : Cl = 1 : 2 : 4) with 200 ccm. of water and 24 ccm. of hydrochloric acid 22° Bé. to a paste, cooling with 150 gr. of ice, adding a solution of 8 gr. of sodium nitrite in 50 ccm. of water, adding 550 gr. of tragacanth 60 : 1000, and, before use, further adding 20 gr. of sodium acetate.

The dyestuff has most probably the following structural formula:

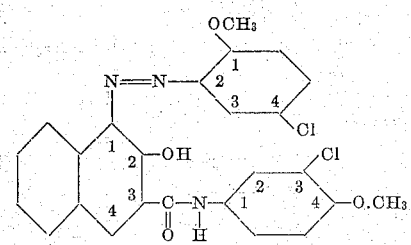

4. Material is padded with an aqueous solution containing, in one liter: 23 gr. of 2.3-hydroxynaphthoic acid-chloroanisidide (NH : Cl : OCH₃ = 1 : 3 : 4), 65 gr. of 22° Bé. caustic soda solution, and 20 gr. of sodium ricinoleate. The material is then dried, and printed with the printing color obtained as follows: 16.8 gr. of 4-chloro-3-anisidine are dissolved in 24 ccm. of hydrochloric acid 22° Bé. and 200 ccm. of boiling water; the resulting solution is then well cooled by the addition of 150 gr. of ice; there is then added, while stirring, a solution of 8 gr. of sodium nitrite in 50 ccm. of water, and the whole is made up to 500 gr. with water. This diazo-solution is thickened with 480 gr. of tragacanth 60 : 1000. Before use, there are added 20 gr. of sodium acetate cryst.

The dyestuff has most probably the following structural formula:

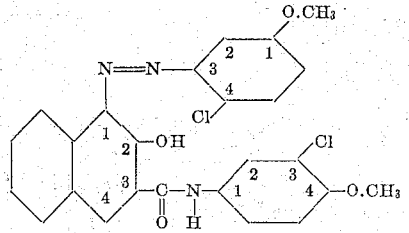

5. Material is padded with an aqueous solution containing, in one liter: 23 gr. of 2.3-hydroxynaphthoic acid-chloro-phenetidide (NH : Cl : O.C₂H₅ = 1 : 2 : 4), 60 gr. of 22° Bé. caustic soda solution and 20 gr. of para-soap PN. It is then dried and printed with a printing color which is prepared as follows: 17.5 gr. of 4-chloro-2-toluidine are dissolved in 200 ccm. of water and 20 ccm. of hydrochloric acid 22° Bé.; this solution is iced with 150 gr. of ice, and there is added thereto a solution of 8 gr. of sodium nitrite in 50 ccm. of water; 540 gr. of tragacanth 60 : 1000 are added with stirring to the resulting diazo-solution. Before use, there are added further 20 gr. of sodium acetate.

The dyestuff has most probably the following structural formula:

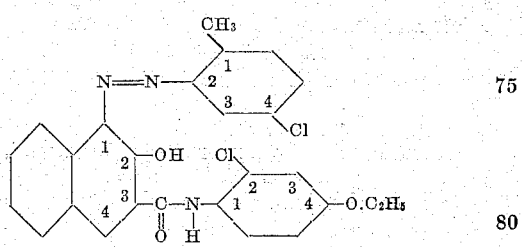

6. Material is padded with an aqueous solution containing, in one liter: 27 gr. of 2.3-hydroxynaphthoic acid-chloro-phenetidide (NH : Cl : O.C₂H₅ = 1 : 2 : 4), 60 gr. of 22° Bé. caustic soda solution, and 20 gr. of para-soap PN. It is then dried, and printed with a printing color which is prepared as follows: 15.7 gr. of para-chloro-anisidine is mixed to a paste with 200 ccm. of water and 24 ccm. of hydrochloric acid 22° Bé., 150 gr. of ice are added, and thereafter a solution of 8 gr. of sodium nitrite in 50 ccm. of water. The resulting diazo-solution is thickened by the addition of 550 gr. of tragacanth 60 : 1000. Before use, 20 gr. of sodium acetate are added.

The dyestuff has most probably the following structural formula:

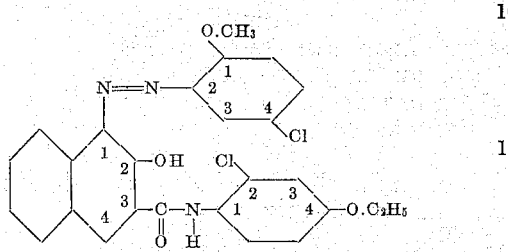

7. Material is padded with an aqueous solution containing, in one liter: 23 gr. of 2.3-hydroxynaphthoic acid-chloro-phenetidide (NH : Cl : O.C₂H₅ = 1 : 2 : 4), 65 gr. of 22° Bé. caustic soda solution, and 20 gr. of sodium ricinoleate. It is then dried, and printed with a printing color which is prepared as follows: 16.8 gr. of 4-chloro-3-anisidine are dissolved in 24 ccm. of hydrochloric acid 22° Bé. and 200 ccm. of boiling water; 150 gr. of ice are then added, and thereafter with good stirring there is added a solution of 8 gr. of sodium nitrite in 50 ccm. of water. Water is added, to make up to 500 gr. This diazo-solution is thickened with 480 gr. of tragacanth 60:1000. Before use, there are added 20 gr. of sodium acetate cryst.

The dyestuff has most probably the following structural formula:

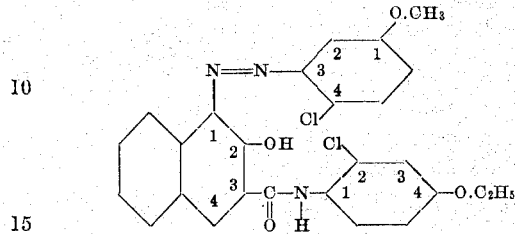

8. Material is padded with an aqueous solution containing, in one liter: 23.7 gr. of 2.3-hydroxynaphthoic acid-5-chloro-4-toluidide ($NH:CH_3:Cl=1:4:5$), 80 ccm. of 22° Bé. caustic soda solution, and 20 gr. of para-soap PN. It is then dried, and printed with the printing color prepared as follows: 14.3 gr. of α-naphthylamine base are dissolved, with heating, in 200 ccm. of water and 10 ccm. of hydrochloric acid 22° Bé. The solution is cooled, and thereafter there are added 20 ccm. of hydrochloric acid 22° Bé. and 150 gr. of ice. After cooling to 0° C., there are poured into the solution, with stirring, 26 ccm. of a sodium nitrite solution containing 290 gr. of sodium nitrite per liter. The whole is filtered, made up to 500 gr. with water, and added to 470 gr. of tragacanth 60:1000, with stirring. Before use, there are added further 30 gr. of sodium acetate.

The dyestuff has the following structural formula:

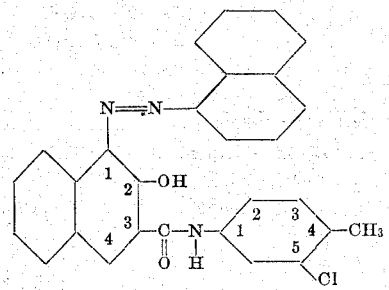

9. Material is padded with an aqueous preparation containing, in one liter 35.9 gr. of 2.3-hydroxynaphthoic acid-5-chloro-4-anisidide ($NH:OCH_3:Cl=1:4:5$), 115 ccm. of 22° Bé. caustic soda solution, and 25 gr. of para-soap PN. It is then dried, and printed with a printing color obtained as follows: 14.4 gr. of benzidine base are dissolved in 150 ccm. of boiling water and 16 ccm. of hydrochloric acid 22° Bé.; the solution is cooled by the addition of 200 gr. of ice, and 27.2 ccm. of hydrochloric acid 22° Bé. are added. Into the cooled solution are introduced slowly 41.6 ccm. of a sodium nitrite solution containing 290 gr. of sodium nitrite per liter. The whole is allowed to stand for 5–10 minutes, and thereafter is made up to 500 gr. with water. The resulting solution is thickened by admixture with 458 gr. of tragacanth 60:1000. Before use, there are added 42 gr. of sodium acetate.

The dyestuff has the following structural formula:

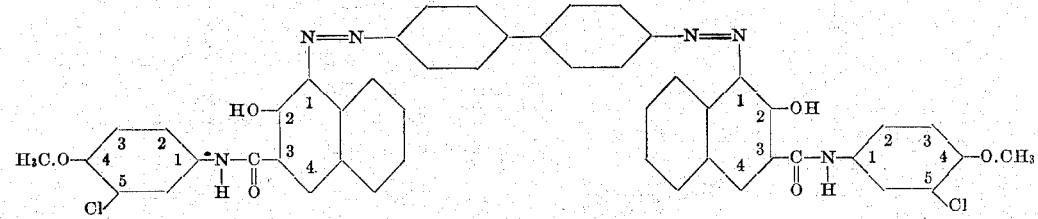

10. Yarn is impregnated with an aqueous preparation containing, in one liter: 11.8 gr. of 2.3-hydroxynaphthoic acid-5-chloro-4-toluidide ($NH:CH_3:Cl=1:4:5$), 20 ccm. of 34° Bé. caustic soda solution and 30 ccm. of sodium Turkey red oil 50%. The impregnated yarn is wrung out, and dyed with a diazo-solution prepared as follows: 2.8 gr. of 2.2'-dichloro-benzidine are made into a paste with 5.5 ccm. of hydrochloric acid 20° Bé. and 20 ccm. of water; 30 gr. of ice are added, and thereafter 1.5 gr. of a solution of sodium nitrite (containing 290 gr. of sodium nitrite per liter) are added while stirring; the whole is made up with cold water to 1 liter. Before use, there are added thereto 4 gr. of sodium acetate.

After dyeing, the yarn is well washed, and soaped.

The dyestuff has most probably the following structural formula:

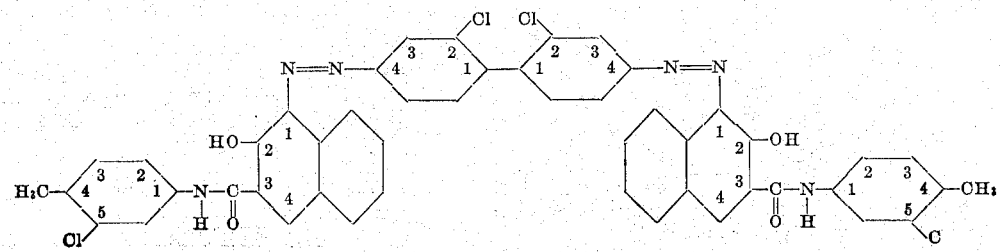

11. Into an aqueous suspension containing, in one liter: 6.54 gr. of sodium salt of 2.3-hydroxynaphthoic acid-5-chloro-4-anisidide (NH:O.CH₃:Cl=1:4:5), 21 ccm. of 22° Bé. caustic soda solution, and 146 gr. of spar, there is poured slowly, while stirring, the diazo-solution which is obtained as follows:

2.53 gr. of 3.3'-dichloro-benzidine are dissolved in 200 ccm. of hot water and 1.6 ccm. of hydrochloric acid 22° Bé.; the solution is cooled by the addition of 600 ccm. of water and 100 gr. of ice, and to it are added 3.2 ccm. of hydrochloric acid 22° Bé. Into the cool solution there are introduced, while stirring 5.2 ccm. of sodium nitrite solution (containing 290 gr. of sodium nitrite per liter). Before use, there are added 4 gr. of sodium acetate, and sufficient water to make 1 liter.

The dyestuff has most probably the following structural formula:

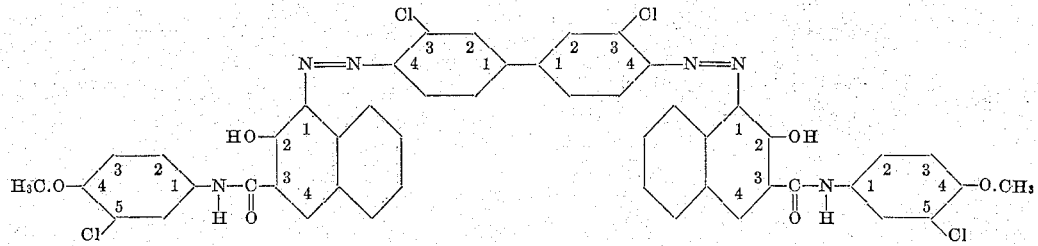

Having now described my invention, what I claim is:

1. As new products, the azo dyes of the general formula:

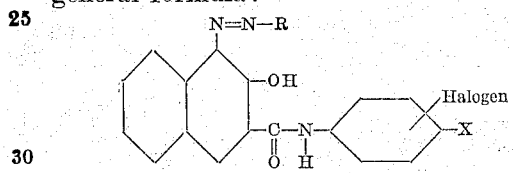

wherein X represents an alkyl- or alkyloxy-group, and wherein R represents an aryl residue which may be further substituted.

2. As new products, the azo dyes of the following formula:

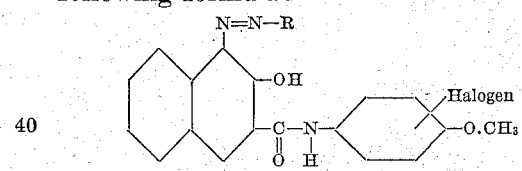

wherein R represents an aryl residue which may be further substituted.

3. As new products, the azo dyes of the following formula:

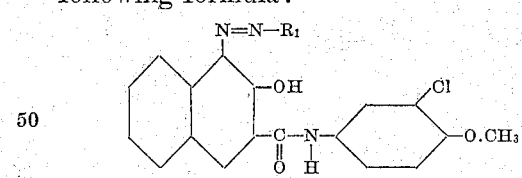

wherein $R_1$ represents the residue of an aromatic compound of the benzene series which may be further substituted.

4. As a new product, the azo dye of the following formula:

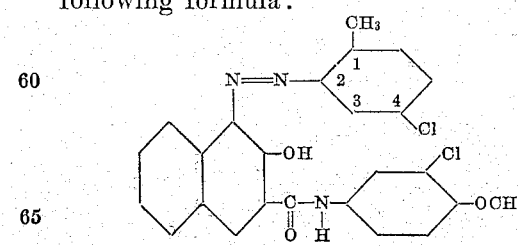

5. Material dyed with the dyes of claim 1.
6. Material dyed with the dyes of claim 2.
7. Material dyed with the dyes of claim 3.
8. Material dyed with the dye of claim 4.
9. As new products the azo dyes of the general formula:

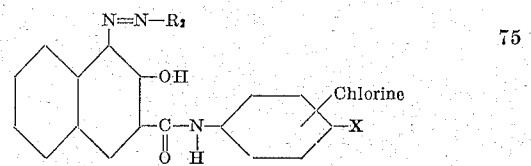

wherein X represents an alkyl or alkyloxy group and $R_2$ represents a benzene nucleus which may be substituted by an alkyl group, an alkyloxy group or a halogen atom.

10. As new products the azo dyes of the general formula:

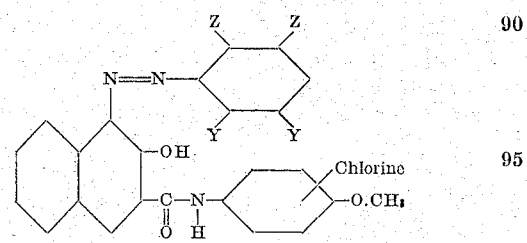

wherein Y represents hydrogen or a chlorine atom, and Z represents hydrogen, alkyl or alkyloxy, at least one Z being an alkyl or alkyloxy.

11. Material dyed with the dyes of claim 9.
12. Material dyed with the dyes of claim 10.

In testimony whereof, I affix my signature.

Dr. HERMANN WAGNER.